E. Wagoner
Rice Planter
No. 74957  Patented Feb. 25. 1868
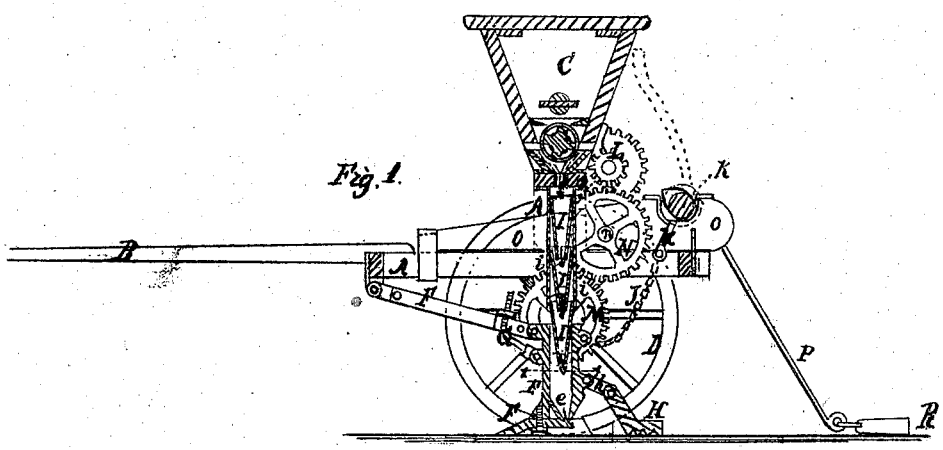
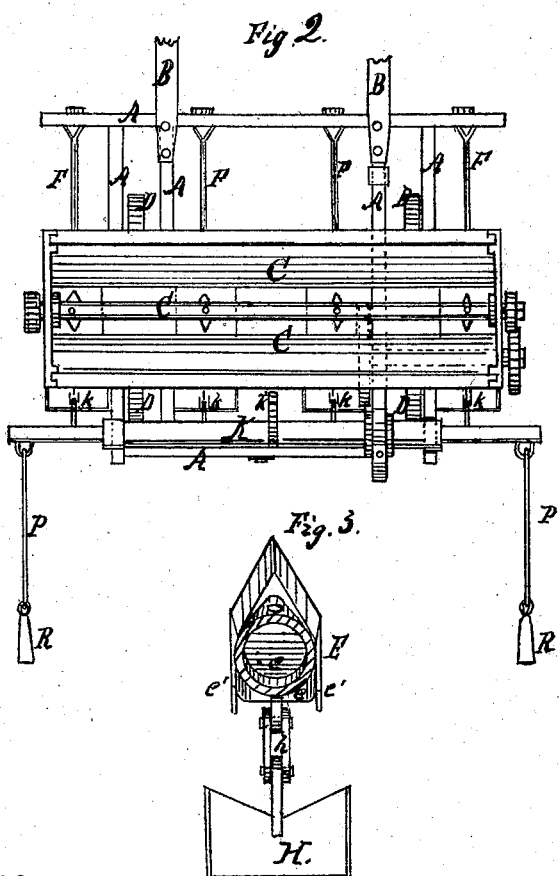
Witnesses.
S. C. Kemon
C. A. Pettit
Inventor
Elijah Wagoner
by Munn & Co.
Attorneys.

United States Patent Office.

ELIJAH WAGONER, OF WESTMINSTER, MARYLAND, ASSIGNOR TO HIMSELF AND G. W. MATHEWS.

Letters Patent No. 74,957, dated February 25, 1868.

IMPROVEMENT IN RICE-PLANTERS.

*The Schedule referred to in these Letters Patent and making part of the same.*

TO ALL WHOM IT MAY CONCERN:

Be it known that I, ELIJAH WAGONER, of Westminster, in the county of Carroll, and State of Maryland, have invented a new and improved Rice-Planter; and I do hereby declare the following to be a full, clear, and exact description of the same, sufficient to enable those skilled in the art to which my invention appertains to make use of it, reference being had to the accompanying drawings, forming part of this specification, and in which—

Figure 1 is a longitudinal vertical section,
Figure 2 is a plan, and
Figure 3 is a horizontal section of one of the seed-conductors, showing the plough and covering-attachment.

This invention is a machine for planting and covering rice, by which all the operations required in the planting of that article are as carefully and accurately performed as if done by hand, and by which one man is enabled to perform the work hitherto requiring the services of dozens of laborers.

Great difficulty has hitherto been experienced in endeavoring to plant rice by a machine, arising from the nature of the ground required for such purpose, and the care and accuracy with which the seed must be covered very lightly with fine earth. The planting is done upon a low, flat soil, which is most of the year submerged, and which is cut up by deep trenches required to drain off the water preparatory to the planting and cultivating. The machine must be enabled to plant close up to the edge of such trenches, or so much ground will be wasted as to make hand-labor the more economical of the two methods of planting.

The machine which I have invented is intended to obviate all these difficulties, and to enable one man with a single draught-horse or mule to plant as much ground as from twenty to forty men can do by hand, performing all the work thoroughly, and economizing the ground to the utmost extent.

In the drawings, A A represent the frame, B B the thills, C the seed-box, and D the wheels of my machine. These parts are all constructed as in ordinary seed-planters, except that the wheels are closer together, the ends of the seed-box jutting far enough beyond them to allow one plough on each side of the machine to operate outside of the wheels, in order that the machine may work close up to the edges of the drains above mentioned. E E are the ploughs, the general shape of which resembles a boot, the foot being in form like a sad-iron, and the seed falling through the leg E', and dropping upon an incline, $e$, at the heel, which scatters it the whole width of the plough. Small flanges or guards, $e'$ $e'$, at the sides of the incline, keep the dirt from falling back upon the furrow until after the seed is properly distributed. The under side of the plough is somewhat concave, resembling the bottom of a horse's hoof, for the purpose of leaving a slight space between the incline and the level bottom of the furrow, by which the seed will be better scattered, and the fine dirt will at the same time be better separated from the coarse. The upper end of the plough is hinged to the rear end of an arm, F, which is itself hinged to the forward beam of the frame, so as to let the plough rise and fall with the inequalities of the ground. Below the hinge by which the plough is attached to the arm F is a rod, G, hinged to the plough, and passing up through the arm F, terminating in a screw and nut, the latter of which rests upon the arm. By adjusting this nut, the inclination of the plough can be regulated and adjusted at pleasure. Directly behind the plough runs a coverer, H, connected to the rear side of the plough by a double joint, $h$, in order that it may rise and fall without losing its horizontality. The coverer is cast in a solid piece, of considerable weight, a little wider than the plough, and having a concave front edge in order to gather the dirt from the sides of the furrow and carry it to the middle, and a corrugated or toothed under surface, in order to pulverize and equalize the depth of the dirt left upon the seed. The conductors, which convey the seed from the box C to the ploughs E E, are composed of funnel-form sections, I I I, the upper or larger end of one section enclosing the lower or smaller end of the one above it, and the sections being attached together by a strip of leather, $i$. By this means they will accommodate themselves to the rising and falling of the ploughs. Each plough is connected by a chain, J, to an arm, $k$, projecting forward from a roller, K, which extends across the whole width of the machine behind the seed-box, and is operated by a lever, $k'$, in order that all the ploughs may be raised at once when necessary.

The agitator of the seed-box is operated by a shaft, L, which receives its motion from a spur-wheel, M, connected with one of the draught-wheel axles through the medium of an idle-wheel, N. The latter wheel runs on a dead-spindle, n, fixed to a slide, O, in such a manner that, when the slide is retracted, the idler and wheel M are ungeared, but when thrown forward, they are in gear. The slide O is provided with a notch, o, through which the roller K passes, and the latter has a pin or cam, m, upon it at that point, which slides the piece O forward, and brings the wheels M and N into gear when the ploughs are in working position, and slides the piece O back, throwing said wheels out of gear when the ploughs are raised by means of the roller, as in going to and from the field, passing over obstacles, &c., where it is necessary that the seed should not be dropped from the box. From the ends of the roller hang loose rods, P P, to the lower extremity of which is attached a weight, R, which drags upon the ground behind the machine, and marks the width that has been planted. A hook is provided for confining the lever when the ploughs are raised.

Having thus described my invention, what I claim as new, and desire to secure by Letters Patent, is—

1. The ploughs E E, when constructed in the form described, and provided with the incline e and guards e' e', substantially as and for the purpose set forth.

2. Connecting the coverer to the plough by a double joint, h, as and for the purpose described.

3. The coverer H, when constructed in the form described, and provided with the concave-forward edge, and a corrugated under surface, substantially as and for the purpose specified.

4. The rod G, passing from the plough through the arm F, and provided with a screw and nut, by which inclination of the plough can be adjusted, substantially as specified.

5. Constructing the seed-conductors of the funnel-form sections I I I, connected by straps i i, substantially as and for the purpose specified.

6. The combination of the idler N, slide O, and roller K, substantially as and for the purpose indicated.

7. The markers R R, when attached to the machine, and operating substantially as and for the purposes set forth.

8. The arrangement herein described of a hoe or trencher outside of each of the supporting-wheels.

To the above specification of my improvement, I have signed my hand, this fourteenth day of January, 1868.

ELIJAH WAGONER.

Witnesses:
   CHAS. A. PETTIT,
   SOLON C. KEMON.